United States Patent [19]
Tazawa et al.

[11] Patent Number: 5,646,746
[45] Date of Patent: Jul. 8, 1997

[54] IMAGE INPUT DEVICE HAVING CARRIAGE THAT INCLUDES A MOVABLE ORIGIN DETECTOR

[75] Inventors: Masashi Tazawa, Kanagawa-ken; Toru Ochiai, Chiba-ken; Toshiya Aikawa, Kanagawa-ken; Eisaku Maeda; Maki Suzuki, both of Chiba-ken, all of Japan

[73] Assignee: Nikon Corporation, Tokyo, Japan

[21] Appl. No.: 325,572

[22] Filed: Oct. 19, 1994

[30] Foreign Application Priority Data

Oct. 27, 1993 [JP] Japan ................................. 5-291376
Nov. 24, 1993 [JP] Japan ................................. 5-317415

[51] Int. Cl.$^6$ ................................................. H04N 1/04
[52] U.S. Cl. ..................... 358/471; 358/487; 358/488; 358/497
[58] Field of Search ........................ 358/400, 401, 358/487, 488, 494, 496, 497, 483, 474; 355/55, 58, 63, 75, 230, 233

[56] References Cited

U.S. PATENT DOCUMENTS

| | | | |
|---|---|---|---|
| 5,072,311 | 12/1991 | Hiramatsu et al. | 358/487 |
| 5,101,287 | 3/1992 | Akuzawa | 358/488 |
| 5,109,288 | 4/1992 | Moriya | 358/488 |
| 5,113,268 | 5/1992 | Yoshida et al. | 358/487 |
| 5,245,440 | 9/1993 | Sato | 358/488 |
| 5,335,093 | 8/1994 | Imoto | 358/487 |
| 5,371,614 | 12/1994 | Ito | 358/487 |
| 5,420,700 | 5/1995 | Maeda et al. | 358/487 |

FOREIGN PATENT DOCUMENTS 3-145881  6/1991  Japan.

*Primary Examiner*—Kim Vu
*Assistant Examiner*—Kimberly A. Williams
*Attorney, Agent, or Firm*—Oliff & Berridge

[57] ABSTRACT

An image input device having a movable carriage is provided with an origin detection element that moves out of the path of the document when the document is inserted into the carriage. Because the origin detection element moves out of the path of the document, even long documents, such as, for example, long strips of film containing multiple frames, can be read by the image input device without increasing the size of the carriage or of the image input device. The origin detection element includes a tapered edge that functions as a contrast marker. When the edge is located in the path of the light between the illumination source and the image reading device, the edge can be used to cause the generation of a signal by the image reading device to enable the detection of the point of origin of the carriage in the secondary scanning direction and/or in the focusing direction.

40 Claims, 16 Drawing Sheets

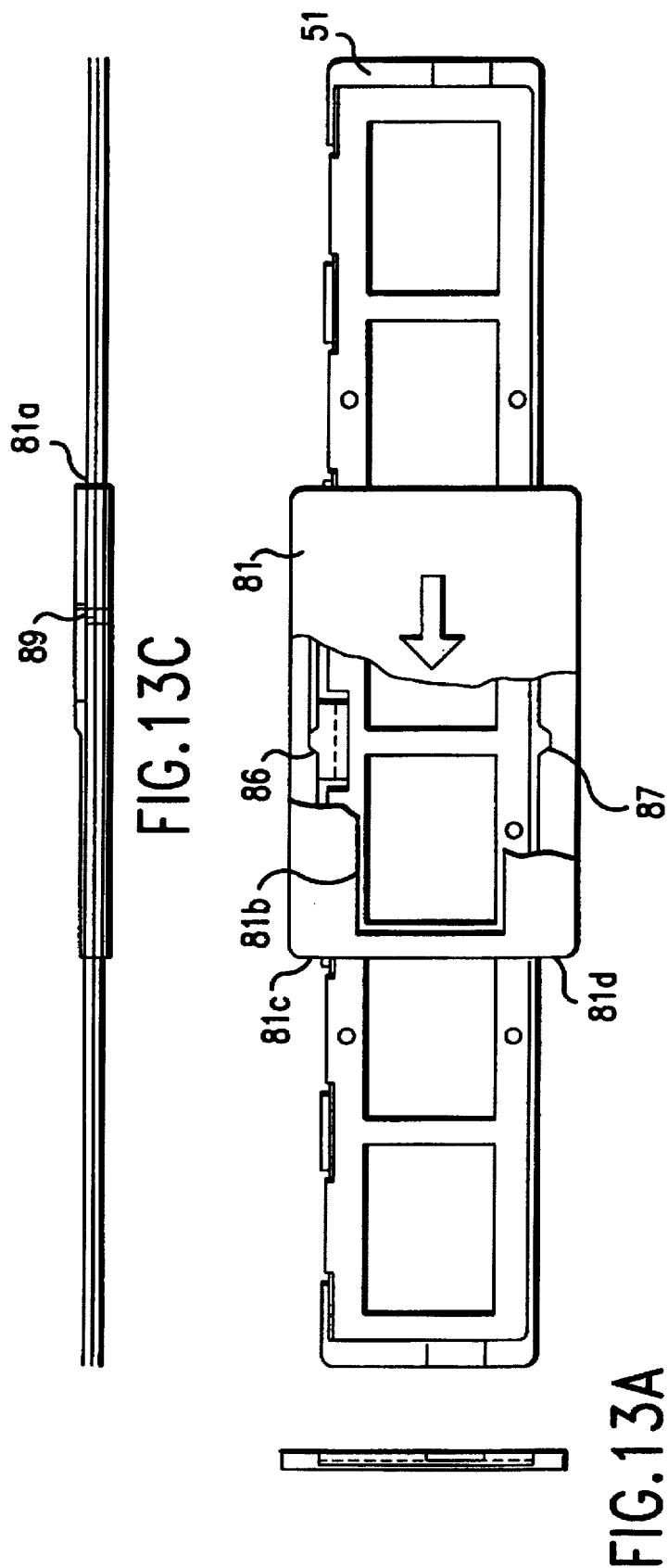

IMAGE INPUT DEVICE HAVING CARRIAGE THAT INCLUDES A MOVABLE ORIGIN DETECTOR

BACKGROUND OF THE INVENTION

1. Field of the Invention

This invention relates to image input devices in which the image of a document, such as, for example, a photographic film, is read by means of light that is transmitted through or reflected by the document.

2. Description of Related Art

An image input device includes many components, including: an optical illumination system comprised of an illumination source that is located above a moving source document; a scanner that includes a carriage, which maintains the source document in a (preferably) flat position while moving the source document past the illumination source; and a photographic optical system that focuses light transmitted through or reflected by the source document onto a reading device, such as, for example, a charge-coupled-device (CCD). Light from the illumination source is transmitted through and optically focused in a line on the source document, and then light from the source document is focused on the CCD. This light (which is transmitted through or reflected by the source document) is then read as a single line of data. Following the single line of data reading, the scanner moves the source document by a single line increment, changing the position of the original document. The source document is then re-read, scanning of the entire document being accomplished through a repetitive reading and movement process.

An image input device having the structure described above is shown in Japanese Laid-Open Patent Application No. 3-145881, which receives a transparent film or slide as the original source document. A carriage transports the film from a film insertion opening inwardly, and is capable of moving in a reciprocal motion. An optical reading system emits a line of light for imaging the film. At least one part of the path of the light line has an axis that crosses (i.e., is perpendicular to) the direction of transport of the carriage so that the line of light passes through the transparent film source document.

However, as disclosed in Japanese Laid-Open Patent Application No. 3-145881, the carriage which supports and transports the film is mounted to move along a single set of fixed shafts. Accordingly, focus adjustment in the direction of the optical axis of the light that is transmitted through the film is not possible. Because of this, it is preferable that the film be absolutely flat. Symmetry in the image reading operation is not possible if the film is curled. In addition, since the construction provides for the securement of the film to the carriage by means of a plate spring on the carriage into which the film is inserted, depending upon variations in the thickness of the film mount, the surface of the film may completely move, with the problem that the correct focus position cannot be maintained.

In order to provide for an autofocus adjustment operation, a mechanism must be provided to enable the detection of an origin point position relative to the direction of the optical axis of the carriage. As shown in FIG. 2 of Japanese Laid-Open Patent Application No. 3-145881, an optically transparent window (36) is provided in the carriage. When the optically transparent window moves past the light source, an edge of the optically transparent window intersects the light transmitted from the illumination source, which causes the output of an image sensor (e.g., a CCD) to change from high to low. The reading start time of the scanner (i.e., knowledge about the leading edge of the film source document) can then be established on the basis of this signal change.

This arrangement has a drawback in that it causes an increase in the size of the carriage because the transparent window is located in front of the film in the carriage. Additionally, when long strips of film (e.g., having a plurality of frames) are to be read by the image reading device, the carriage must be made very long.

Furthermore, with an image input device in which focus adjustment is possible, in order to detect the origin point position in the axial direction of the light transmitted through the document, heretofore there has been the necessity of detecting the carriage position by means of optical sensors or switches. However, these components are high in cost, and have required a space adequate for their securement.

SUMMARY OF THE INVENTION

It is an object of embodiments of the invention to provide an image input device having an origin point detection arrangement that does not interfere with insertion of documents and that does not require the size of the carriage to be increased when large-sized documents are to be imaged.

It is another object of embodiments of the invention to provide an image input device that is capable of focus adjustment in the direction that light is projected onto the document, without increasing the size of the image input device.

These and other objects are achieved, and the shortcomings in conventional apparatus are addressed, by embodiments of the invention, which include an image input device having a movable carriage provided with an origin detection element that moves out of the path of the document when the document is inserted into the carriage. Accordingly, because the origin detection element moves out of the path of the document, even long documents, such as, for example, long strips of film containing multiple frames, can be read by the image input device without increasing the size of the carriage or of the image input device. The document and/or the document holder that contains the document can extend through the carriage, thereby facilitating the reading of long documents.

According to another aspect of embodiments of the invention, a tapered edge, which functions as a contrast marker is provided on the origin detection element. When the edge is located in the path of the light between the illumination source and the image reading device (e.g., the CCD), it can be used to cause the generation of a signal by the image reading device to enable the detection of the point of origin of the carriage in the secondary scanning direction and/or in the focusing direction. By making the carriage movable in the focusing direction (i.e., in the direction of the optical axis of the light transmitted to the document) the carriage can be adjusted to perform focusing. The number of parts required and the size of the image input device is reduced because the existing reading device can be used to perform origin position detection.

BRIEF DESCRIPTION OF THE DRAWINGS

The invention will be described in conjunction with the following drawings in which like reference numerals designate like elements and wherein:

FIGS. 13A-13C are front, upper and side surface diagrams of a long strip of film containing multiple frames inserted in a document holder according to the first embodiment of the present invention;

DETAILED DESCRIPTION OF PREFERRED EMBODIMENTS

Embodiments of the present invention are described hereafter, with reference to the drawings. Although the invention is described with reference to an embodiment used in an image input device that reads a transparent document such as a strip of film, the invention is applicable to other types of image input devices. For example, the invention is applicable to image input devices that read documents (such as opaque documents) by reflecting light from the document rather than by passing light through the document. Accordingly, while the term document is intended to encompass transparent films, it also encompasses other types of originals that typically are read. Of course, in such devices the arrangement of the various components could differ from the illustrated embodiments. Additionally, in some situations it would be possible to directly insert the original document into the carriage rather than placing the original document in a document holder as is done with the illustrated embodiment.

Figure 1:
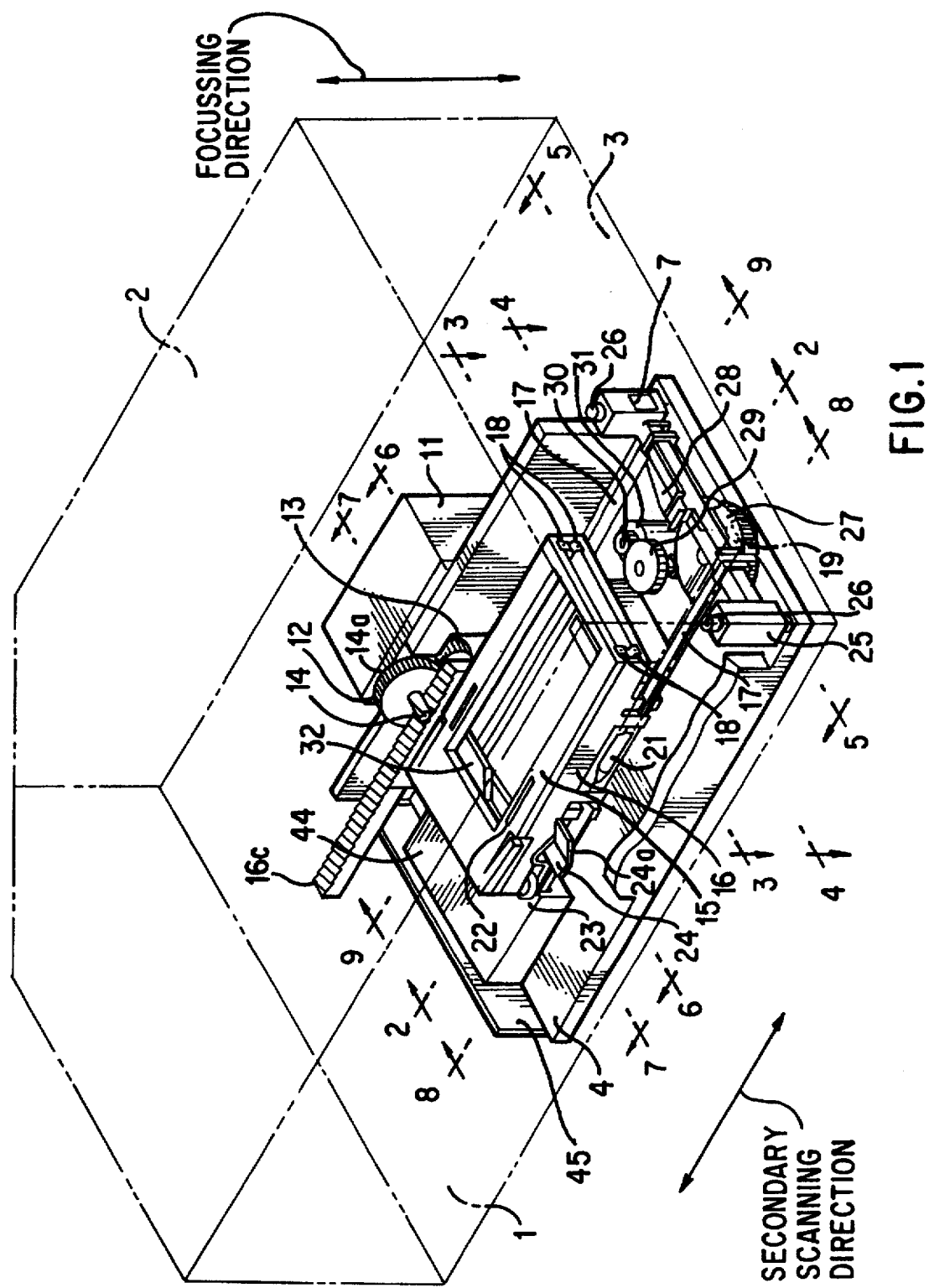
FIG. 1 is an oblique diagram showing a first embodiment of an image input device according to the present invention.

FIG. 1 is an oblique view showing a first embodiment of an image input device according to the present invention.

The body of the image input device includes an optical illumination system that guides the illuminating light to the surface of the original document, which in the disclosed example is a transparent film; a scanner that includes a movable carriage and that serves as a support means to support and scan the film; and a photographic optical system that forms the light that has passed through film into an image on a CCD (charge coupled device), which reads the image. These systems will hereinafter be referred to as the optical illumination system, the scanner and the photographic optical system, respectively.

The optical illumination system, the scanner and the photographic optical system are housed inside a casing 1, 2 and 3. As shown in FIG. 1, the casing is comprised of an aluminum die-cast body 1, an aluminum top cover 2 which covers the top of the body 1, and a polycarbonate front panel 3 that covers the front of the body 1.

Figure 2:
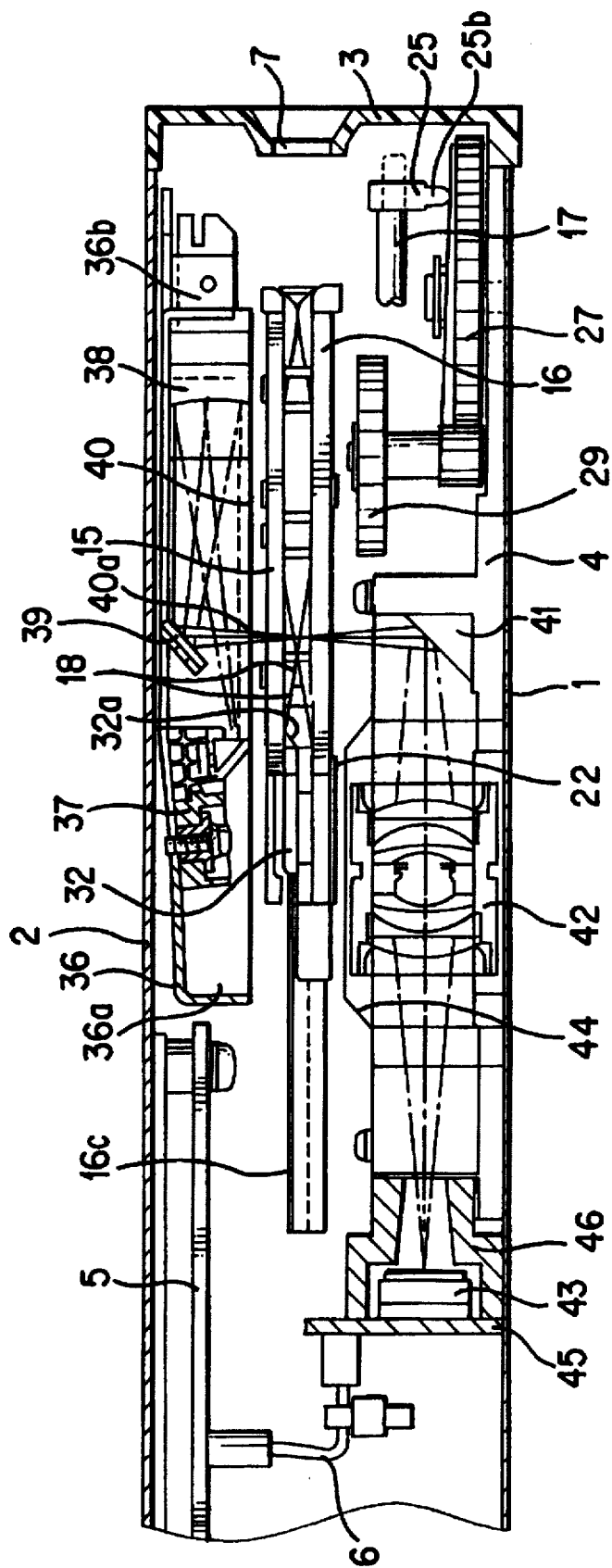
FIG. 2 is a cross-sectional diagram along the line 2—2 of FIG. 1.

A mechanical body 4 houses the image reading system, i.e., the scanner, the optical illumination system and the photographic optical system. To the main base plate 5 shown in FIG. 2 are attached various connectors and the CPU that controls the various components of the image reading device. The mechanical body 4 and the main base plate 5 are secured together, for example, by screws. Furthermore, the front of the top cover 2 is secured by the front panel 3, and the back of the top cover 2 is fixed to the body 1 by means of screws, not shown in the drawing. The image reading system is thus covered by the top cover 2 and the front panel 3.

As shown in FIG. 2, the main base plate 5 and the mechanical body 4 are connected by four harnesses 6. In the front panel 3 is provided an insertion opening 7 into which a document holder (e.g., a film holder) can be inserted, and an LED window, not shown in the drawing, which is used for status display.

In addition, an eject button 19 protrudes from the front panel 3, by which it is possible to eject a film holder that has been inserted into the insertion opening 7. Furthermore, the side of the body 1 opposite the front panel 3 includes a large opening through which it is possible to provide connections for the various connectors provided on the main base plate 5.

Figure 4:
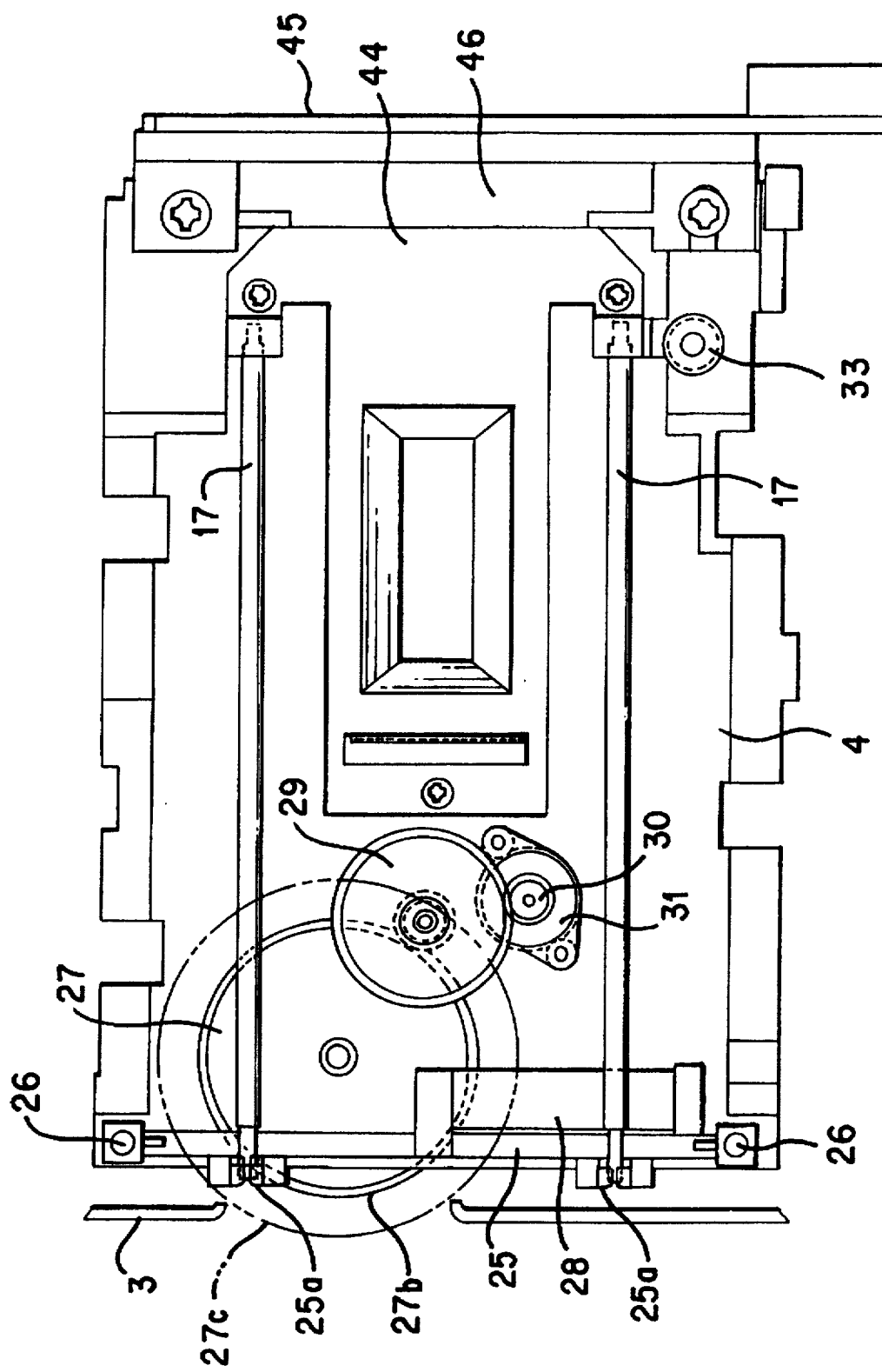
FIG. 4 is a cross-sectional diagram along the line 4—4 of FIG. 1 and shows the focus adjustment mechanism.

An explanation of the scanner is provided hereafter. The scanner is comprised of a carriage and a motor. The carriage includes a film holder support and a movement mechanism, as well as a film alignment mechanism. The carriage includes a carriage 15 and a rack carriage 16, which are arranged opposite each other in a single body with specific spacing, and which is capable of moving along guide bars 17. As shown in FIG. 4, two parallel guide bars 17 are provided along which the carriage is movable in a secondary scan direction. One end of each guide bar 17 is inserted into a slot in the mechanical body, with the other end being inserted into a focus block 25.

The motor includes a power transmission mechanism that transmits motor drive power to the carriage. In particular, a stepping motor 11 drives a reduction gear 14a (formed as a single body with a pinion gear 14) that reduces the revolutions of the stepping motor 11. The stepping motor 11 is fixed to a motor attachment plate 12, which is fixed by screws to the mechanical body 4.

The stepping motor 11, which is fixed by screws to the motor attachment plate 12, rotates a motor gear 13, which is pressed onto the motor shaft, further rotating the pinion gear 14 by means of the reduction gear. In this instance, the stepping motor 11 rotates 0.9° for each 1 step corresponding to each 1 line of movement along the image.

In addition, both edges of the opposing faces of the carriage 15 and the rack carriage 16 are fixed to two film securing springs 18. The film securing springs 18 make contact with and fix the film holder, which is inserted between the carriages 15 and 16.

The film securing springs 18 are identically mounted opposing springs. Hence, the spring force of the film securing springs 18 is balanced, as a result of which, even when film holders of differing thicknesses are inserted between the carriages 15 and 16, the film holder is always positioned centrally between the carriage 15 and the rack carriage 16. Because the central location between the carriage 15 and the rack carriage 16 defines the optical focus position, even if the film holder thickness varies, focus adjustment achieved through the placement of the film holder in the center using the focus cam 27 described hereafter is unnecessary if the surface of the film is centrally positioned in the film holder.

In the rack carriage, a bevel rack 16c of module 0.3, for instance, is formed parallel to the direction of movement of carriages 15, 16, the pinion gear 14 fitting into the bevel rack 16c. Drive power from the stepping motor 11 is transmitted through the gear system, moving the carriage 15 and the rack carriage 16.

An explanation of the optical illumination system follows. As shown in FIG. 2, the optical illumination system is comprised of an illumination base 36, an LED block 37, a toric mirror 38, a 40° mirror 39 and an illumination system cover 40. The entire body is fastened to the mechanical body 4 by means of a countersunk flat-head screw.

The LED block 37, which functions as a light source, is fixed to the top of the illumination base 36 via an insulating sheet by means of an insulating collar and screw. The toric mirror 38 is attached to the illumination base 36 so that the mirror can rotate around a cylindrical protrusion provided in the side surface, and is fixed by screws after the angle has been adjusted. The 40° mirror 39 is attached to a bent component formed in the illumination base 36. The illumination system cover 40 is comprised of a thin plate that covers the LED block 37, the toric mirror 38 and the 40° mirror 39. The illumination system cover 40 is fixed to the illumination base 36 by means of engagements 36a and 36b formed in the illumination base 36 in two locations. Furthermore, a slit 40a is provided in the illumination system cover 40 to allow light to pass through toward the film holder. Light from the outside incident on the inside of the illuminating optical system is blocked by the illuminating system cover 40.

As shown in FIG. 2, the photographic optical system is comprised of a 45° reflective mirror 41, a photographic lens 42, a CCD 43 and a photographic system cover 44. The photographic optical system is positioned in the center of the bottom of the mechanical body 4 where it is shielded on three sides by walls. The 45° reflective mirror 41 is attached to the mechanical body 4. The photographic lens 42 is comprised of a symmetric arrangement of six lenses in four groups, and is fixed to the lens chamber by means of a separation ring and a holding ring, the lens chamber being fixed to the mechanical body by means of a set screw. The CCD base plate 45, which houses the CCD 43, is fixed to the mechanical body 4 via the CCD holder 46. In addition, the photographic system cover 44 is fixed along the perimeter of the component shielded by the walls.

In addition, the CCD holder 46 also serves the functions of blocking dust and obstructing light. Furthermore, the photographic system cover 44 serves the functions of blocking dust and obstructing light for the photographic optical system as a whole, and also acts as a holding means for the guide bars 17 of the scanner.

Given the structure described above, an explanation of the optical path in the present device is provided hereafter.

The light produced by the LED block 37 is reflected by the toric mirror 38 and by the 40° mirror 39, after which it passes along its optical axis (which is vertical and, therefore, perpendicular to the secondary scanning direction) through the original film held in the carriage. The light which has passed through the original film has its path changed 90° by the 45° reflective mirror 41, after which it is formed into an image on the CCD 43 by the photographic lens 42.

Figure 3:
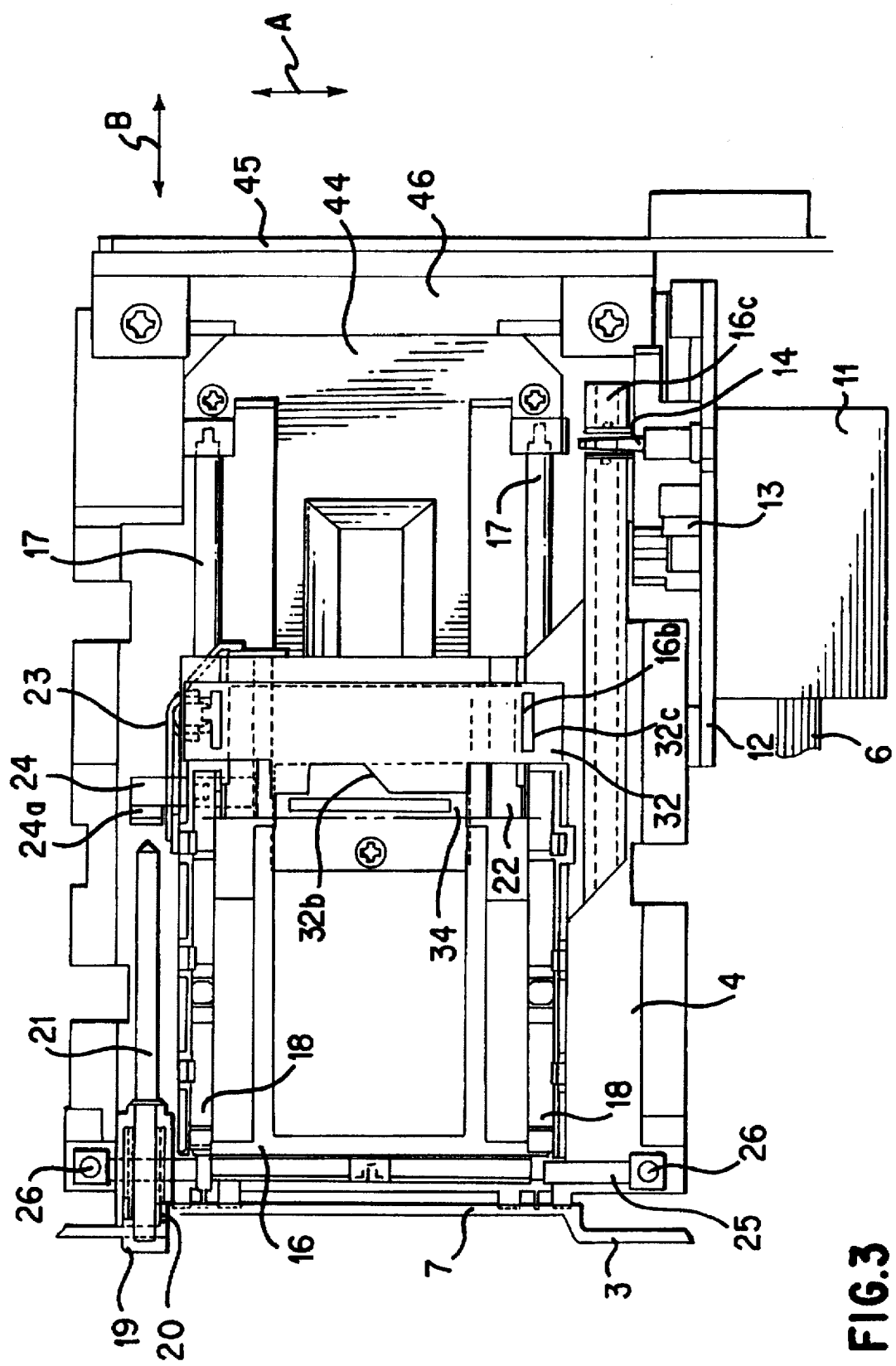
FIG. 3 is a cross-sectional diagram along the line 3—3 of FIG. 1 and shows a top view of the origin detection element mounted on the carriage.
Figure 8:
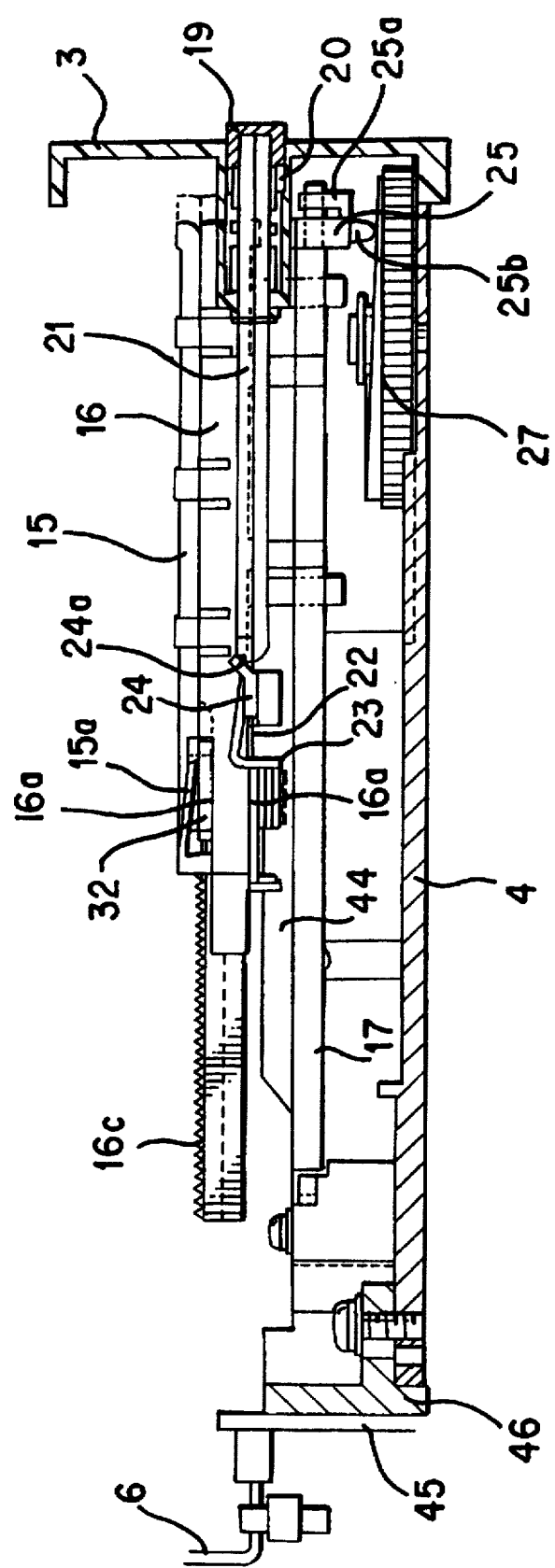
FIG. 8 is a cross-sectional diagram along the line 8—8 of FIG. 1 and shows a portion of the document ejection mechanism.
Figure 9:
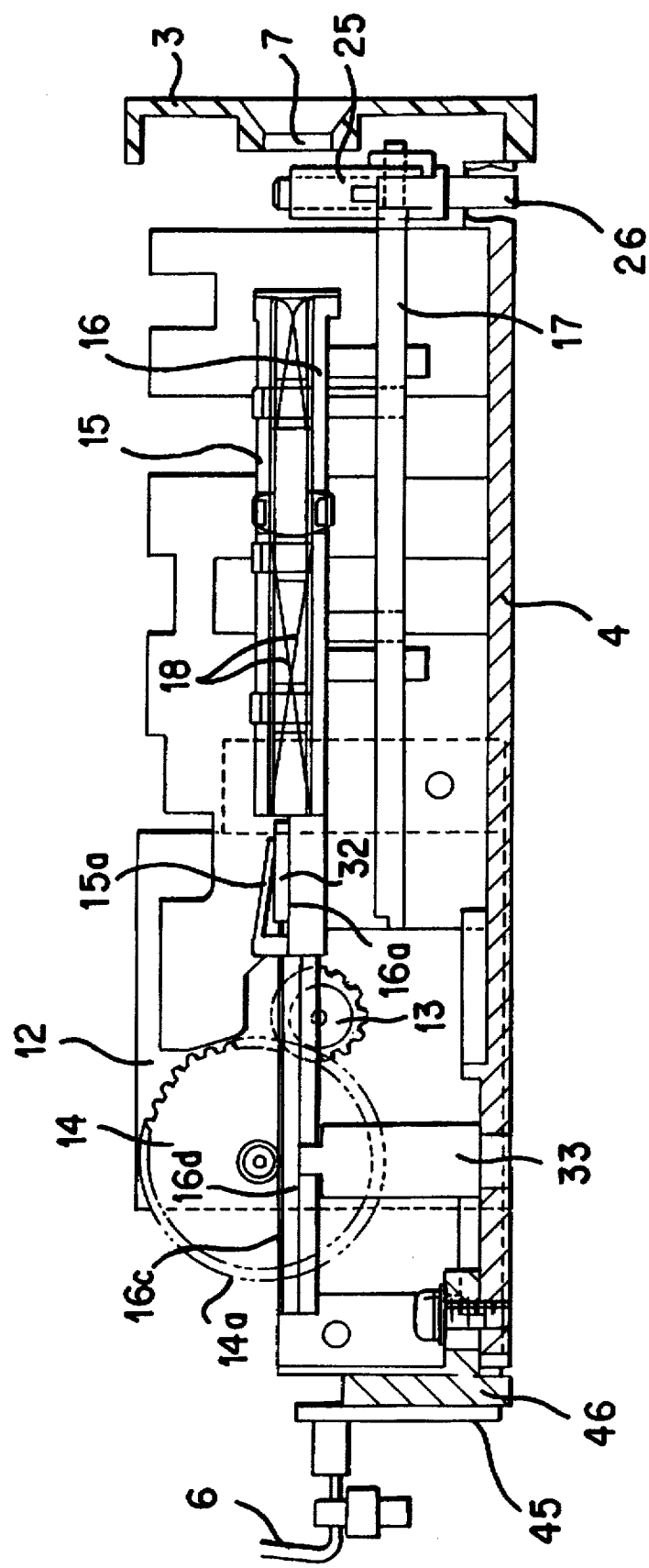
FIG. 9 is a cross-sectional diagram along the line 9—9 of FIG. 1 and shows part of the carriage drive and of the origin detection element.

An explanation of the eject mechanism is provided hereafter, with reference to FIG. 3. The ejection plate 22 is movably attached to the rack carriage 16. As shown in FIG. 8, the ejection plate 22 is in contact with an ejection spring 23 which is attached to the rack carriage 16. The ejection spring 23 forces the ejection plate 22 in the direction in which the film holder is discharged (to the right in FIG. 8). In addition, movement of the ejection plate 22 in the direction of discharge is controlled by a stop plate 24, which is movably attached to the top and bottom of the rack carriage 16 and removably engages ejection plate 22 to block and thereby prevent ejection. The component 24a of the stop plate 24, which protrudes from the rack carriage, and which is provided on the side of stop plate 24 opposite from the part that stops the ejection plate 22, is inclined at approximately a 45° angle.

An eject button 19 is mounted on the front panel 3 and is forced forward (i.e., to the right in FIG. 8) by the button spring 20. An eject bar 21 is attached to the eject button 19. An E-ring is inserted onto the eject bar 21, and prevents it from slipping relative to button 19. The tip of the eject bar 21 comprising an approximately 45° cone.

Figure 6:
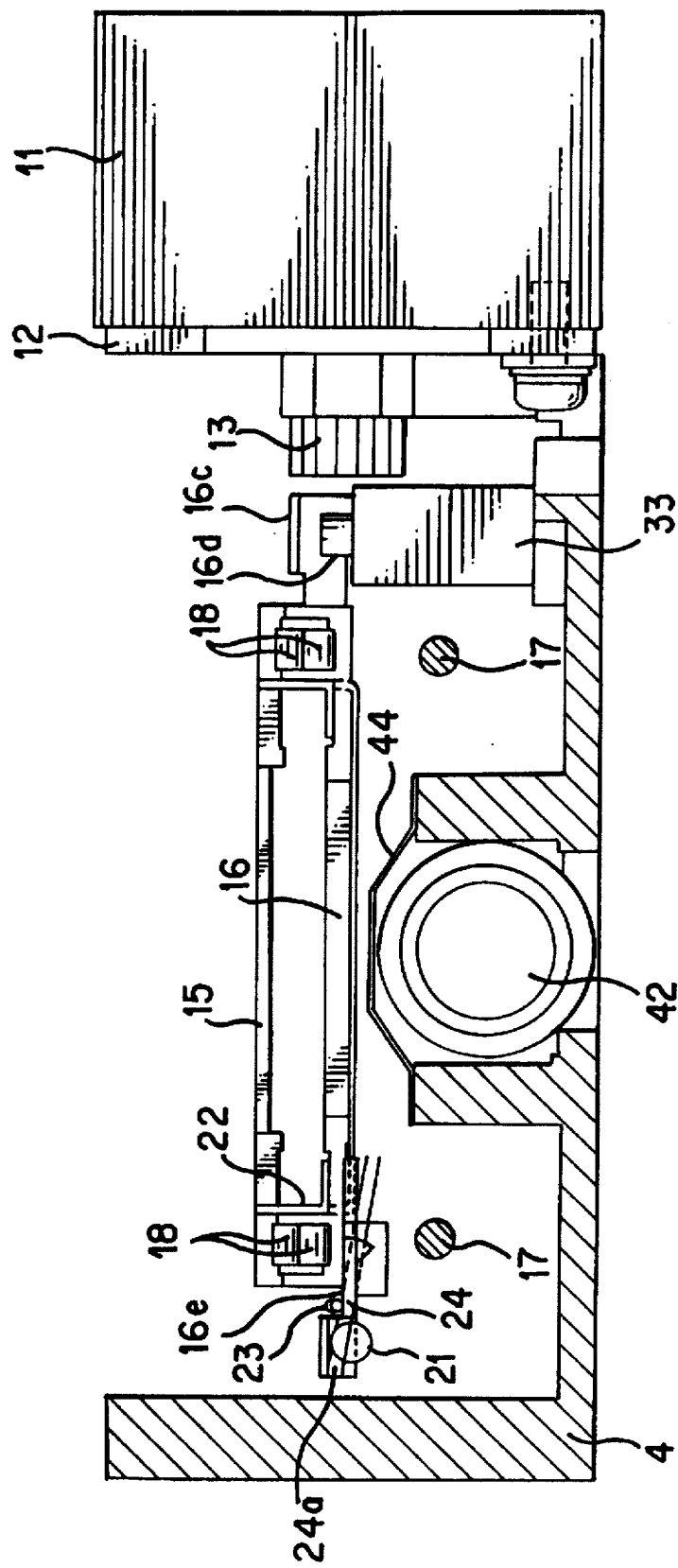
FIG. 6 is a cross-sectional diagram along the line 6—6 of FIG. 1 and is a view of the document ejection mechanism.

The carriage, which houses the film holder, always returns to carriage return position I shown in FIG. 8 when the film is inserted and after the image data has been read. When the carriage is in the carriage return position I and the eject button 19 is pressed, the approximately 45° cone at the tip of the eject bar 21 contacts the approximately 45° surface 24a of the stop plate 24. When the eject button is further depressed, as shown in FIG. 6, the part of the stop plate 24 contacting and stopping the ejection plate 22 rotates in the direction away from the rack carriage, with the point 16e of the rack carriage 16 acting as its center of rotation. With the stop removed from the ejection plate 22, the plate becomes capable of moving in the direction in which the film holder is discharged, the film holder then being discharged under the force of the ejection spring 23 so that the film holder can be retrieved. In addition, an auto eject function can automatically discharge the film holder by causing the stepping motor 11 to rotate and move the carriage component, which houses the film holder, to film holder ejection position II. In position II, surface 24a engages the 45° cone at the tip of eject bar 21, causing the film holder to be ejected as detailed above.

Figure 10:
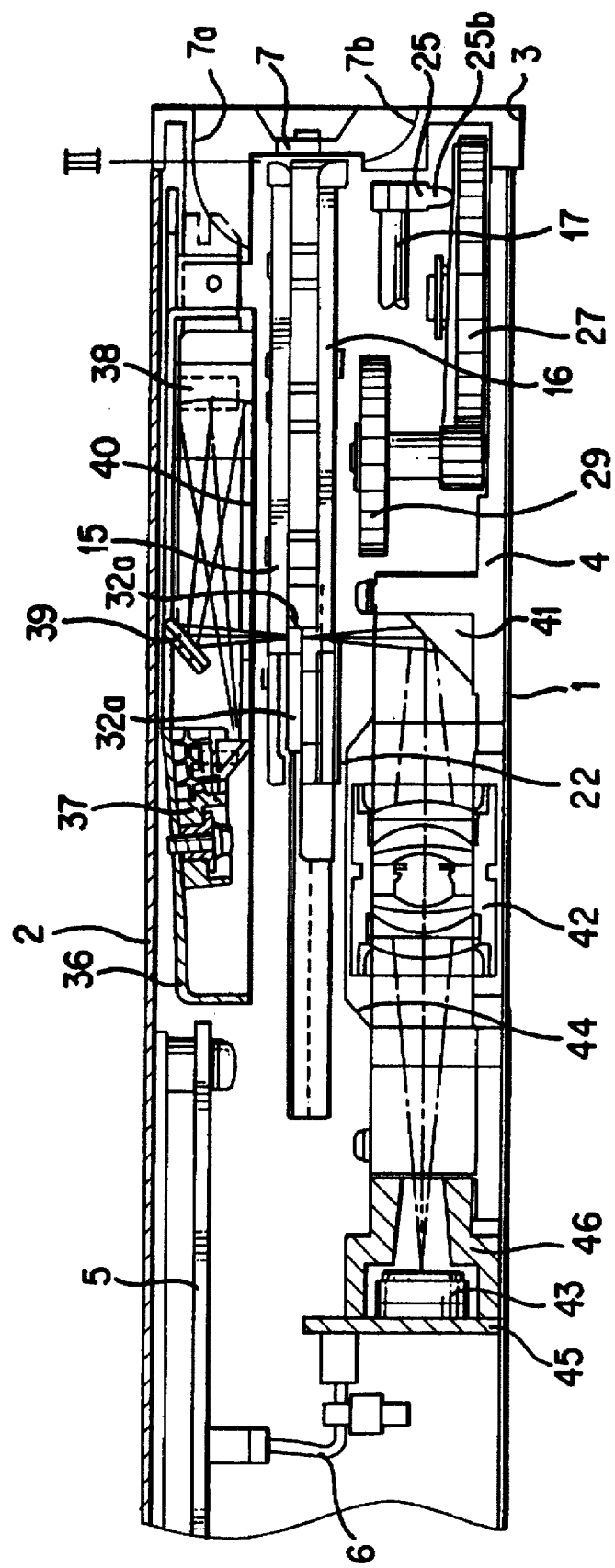
FIG. 10 is a cross-sectional diagram showing the position of elements when the carriage is in a position where the document holder can be removed from the image input device.

FIG. 10 shows an alternative embodiment of the film holder retrieval mechanism. In the insertion opening 7 of the front panel 3 are carved-out portions 7a and 7b. The carved-out portions 7a and 7b, which are carved out on the top and the bottom, are in a shape that allows the film holder to be pulled out by the fingers of the user. The carriage that houses the film holder is designed so that it always returns to carriage return position III when the film is inserted and after the image data has been read. This return position III makes it possible for the fingers of the user to be inserted into the carved-out portions 7a and 7b and grasp the film holder. Accordingly, the film holder can be retrieved by the user without the use of an eject mechanism. By shaping the carved-out portions in the front panel to match the shape of fingers, it is possible to minimize the carved-out shape, making more efficient use of the interior space possible. In addition, with the interior space relationships shown in FIG. 10, even when both the top and bottom of the insertion opening 7 are not carved out toward the interior, if either the top or the bottom is carved out toward the interior and the other side is carved to a position where the film holder can be touched, the film holder can be easily retrieved by the fingers of the user.

Figure 5:
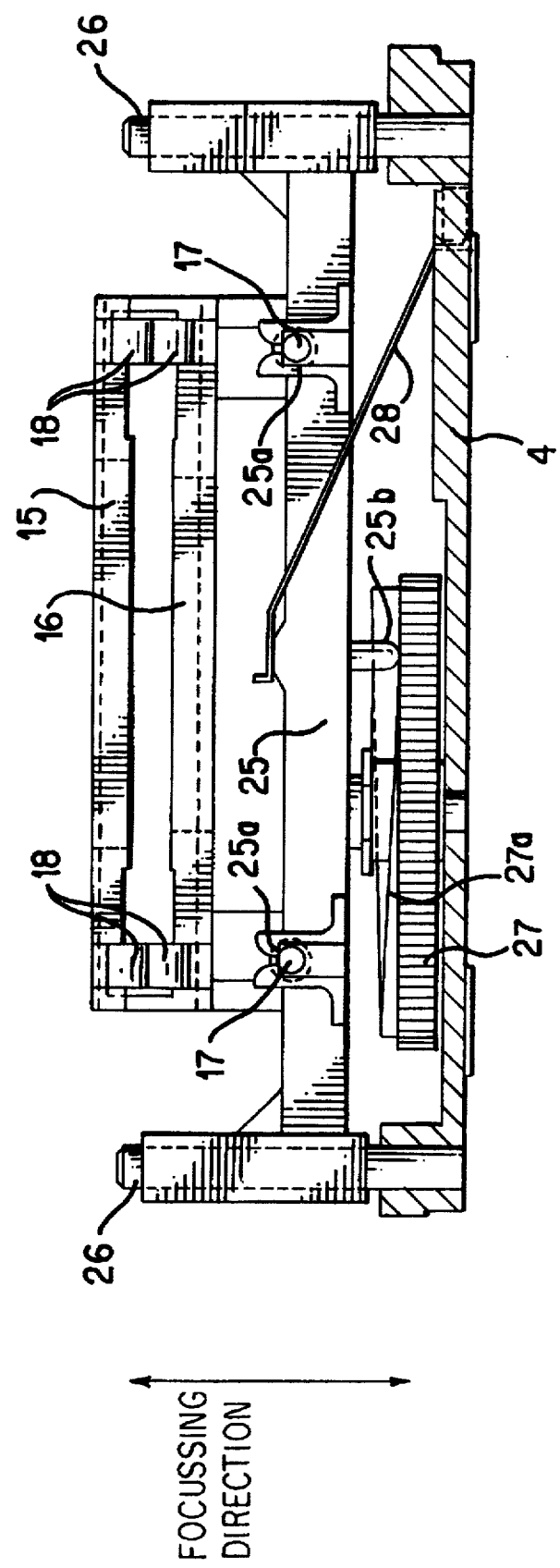
FIG. 5 is a cross-sectional diagram along the line 5—5 of FIG. 1 and also shows the focus adjustment mechanism.

Next, an explanation is provided for the focus adjustment mechanism. Focus adjustment is performed by moving one end of the guide bars 17 up and down. One end of each of the guide bars 17 is in contact with the focus block 25, which is movable up and down. The other end of each of the guide bars 17 is a point of rotational motion, being pivotally fixed to the mechanical body 4. As shown in FIG. 1, both ends of the focus block 25 are slidably fitted over parallel pins 26 that are fixed to the mechanical body 4, allowing motion in the direction of focussing. As shown in FIG. 5, a projection 25b having a spherical tip is centered between the two guide bar pressure components 25a of the focus block 25. The projection 25b is kept in contact with the focus cam 27 by pressure from the focus block retaining spring 28. The cam surface 27a of the focus cam 27 is inclined to a height of about 2 mm in the focussing direction, and focus adjustment is performed by rotating the focus cam 27. The projection 25b of the focus block 25, which is in contact with the focus cam 27, is centered between the guide bars. Consequently, even if there is a shift between the focus block 25 and the parallel pins 26, the guide bars 17 are raised or lowered in the focussing direction without becoming tilted. The image reading position is centered between the guide bars 17. Accordingly, by changing the position of one end of the guide bars 17 by about ±1 mm using the focus cam 27, the reading position can be adjusted by about ±0.5 mm.

As shown in FIG. 4, a gear is formed on the side surface 27b of the focus cam 27, and is linked to the AF motor gear 30 via an idle gear 29. The AF motor gear 30 is pressed onto the shaft of the AF motor 31, making automatic focus possible through rotation of the AF motor 31.

In addition, manual focussing without using the auto focus mechanism also can be performed. With manual focus, the AF motor 31 and idle gear 29 are omitted, and the gear on the side surface 27b of the focus cam is changed into a dial, indicated by the double dashed lines, and is arranged to protrude from the front panel 3. By this means, the focus cam 27c can be turned by hand, making manual focussing possible.

Figure 7:
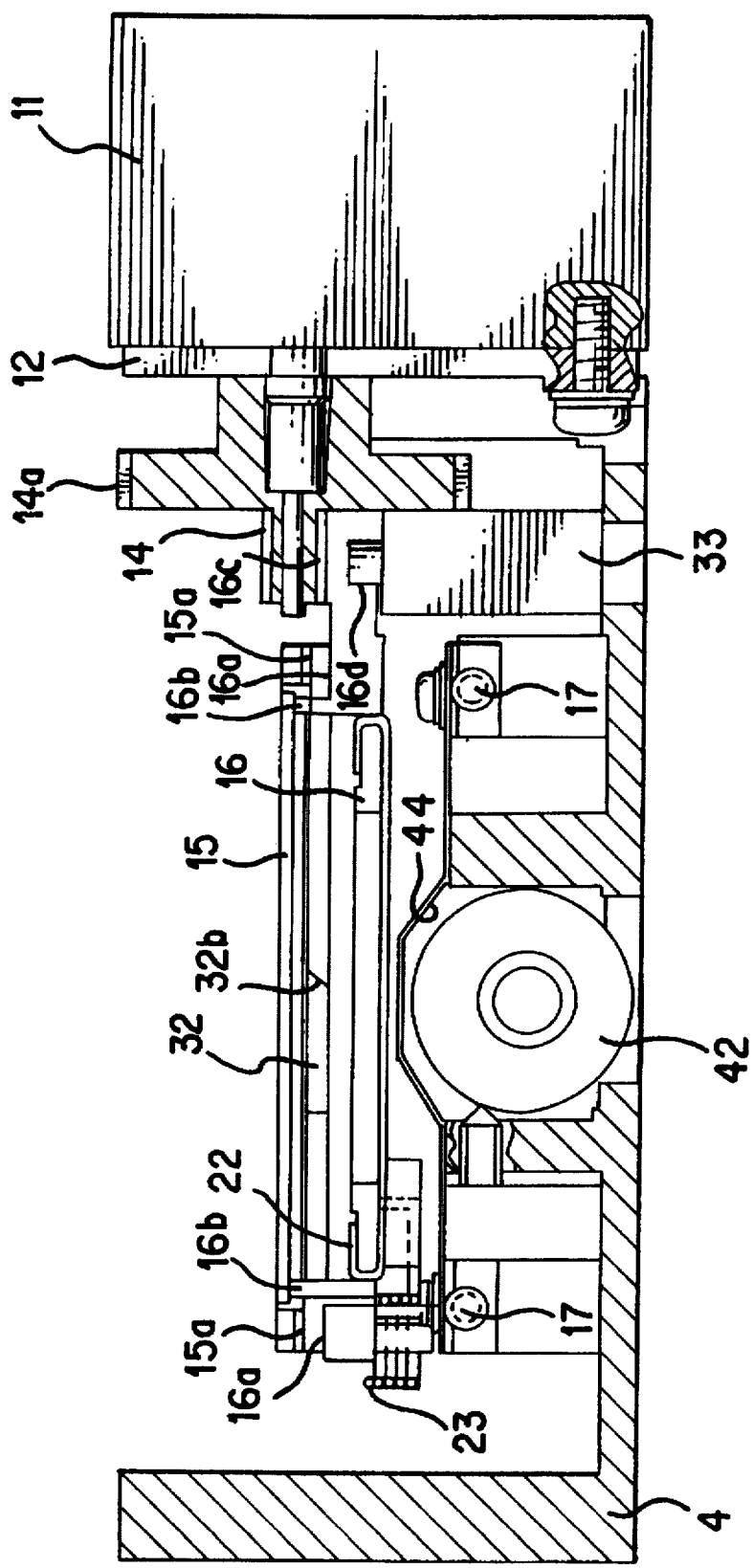
FIG. 7 is a cross-sectional diagram along the line 7—7 of FIG. 1 and shows how the carriage reciprocating mechanism is coupled to the carriage.
Figure 16:
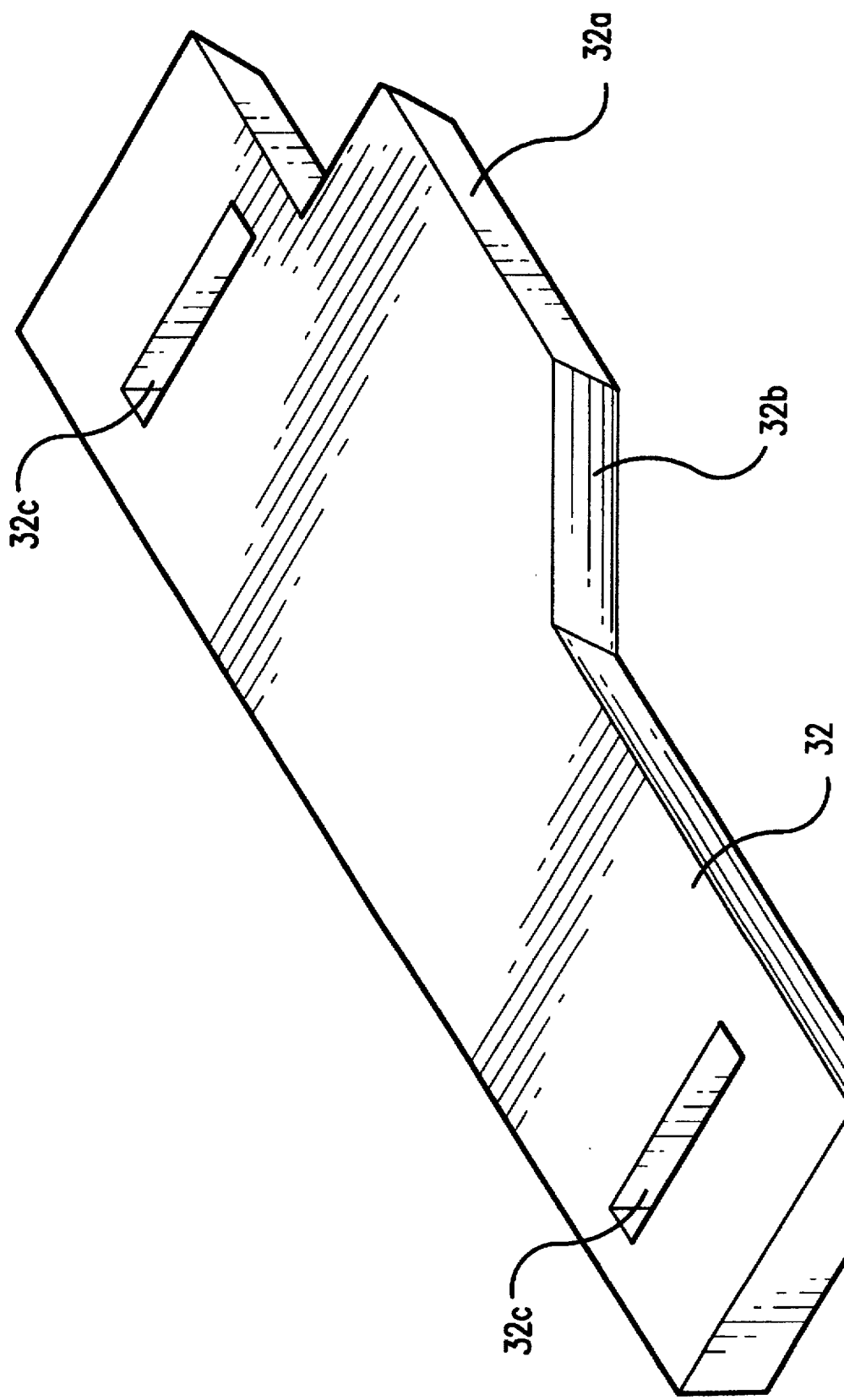
FIG. 16 is an oblique diagram showing the origin detection element according to the first embodiment of the present invention.

An explanation will next be provided about the origin detection structure used for motion in the focussing direction and in the carriage secondary scanning direction. An edge detection plate 32 is shown in Figure 16. The edge detection plate 32 is sandwiched between the rack carriage 16 and the carriage component 15. As shown in FIGS. 3 and 7, openings 32c near the edges of the detection plate 32 slidably receive projections 16b on the rack carriage 16. Consequently, the edge detection plate 32 is guided by the projections 16b of the rack carriage 16, making movement of the edge detection plate 32 possible in the focussing direction (up and down in FIG. 7). As shown in FIG. 8, the edge detection plate 32 is pressed (i.e., biased downward) against the rack carriage focussing direction control component 16a by the stiff component 15a, which is formed in a spring shape on the carriage component 15. In addition, an inclined surface 32a (see FIGS. 2, 10 and 16) is formed at one end of the edge detection plate 32. With this kind of structure, even when a strip-film holder for strip films, which is different from the usual film holder (e.g., single-frame slides), and which will be explained hereafter, is inserted, insertion is possible because the edge detection plate 32 is smoothly pressed by the strip-film holder because of the inclined surface 32a, and withdraws in the direction of focussing out of the path of the strip film holder as detailed below.

Figure 17A:
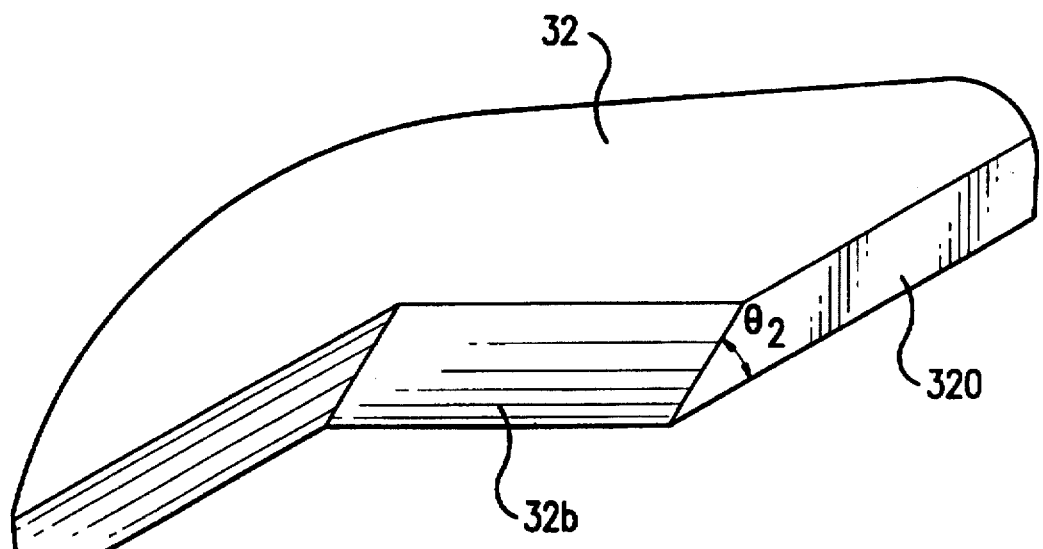
FIGS. 17A-17B are an oblique diagram and an upper surface diagram showing the edges of the origin detection element of the first embodiment of the present invention.
Figure 17B:
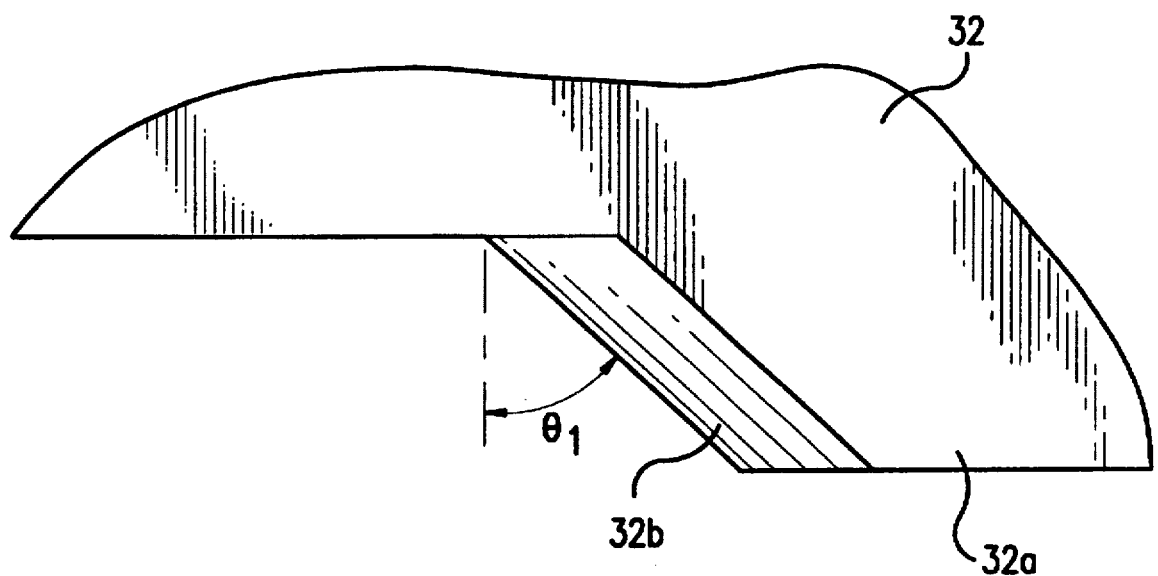

As shown in FIGS. 17A and 17B, the origin detection portion 32b of the edge detection plate 32 is inclined both in the focussing direction and the secondary scanning direction. In particular, origin detection portion 32b is inclined at an angle of about 45° relative to the secondary scanning direction (angle $\Theta 1$) and is also inclined at an angle of about 45° relative to the focussing direction (angle $\Theta 2$). Origin detection is performed using this edge portion of the edge detection plate 32.

Next, an explanation is provided of the origin detection operation.

Figure 11:
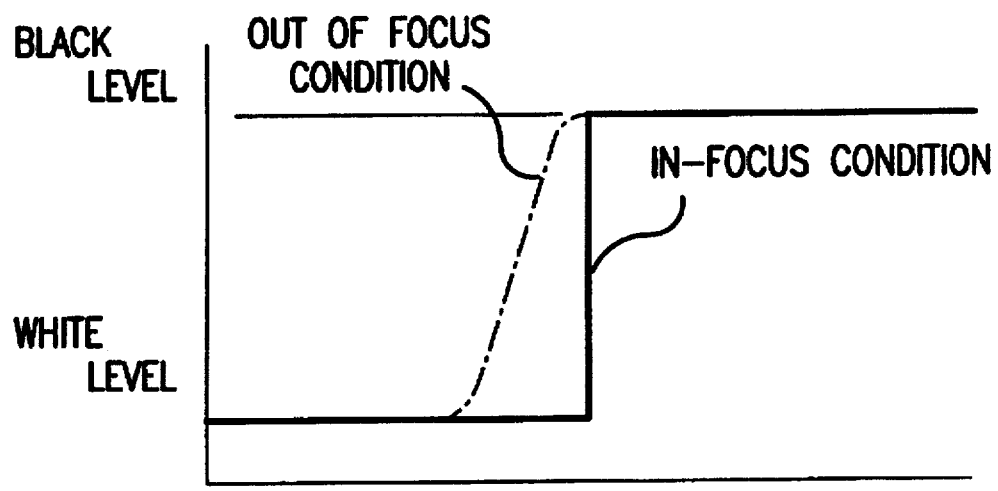
FIG. 11 is a wave diagram showing the focus adjustment operation according to the first embodiment of the present invention.

First, the carriage is moved to a position where the origin detection portion 32b of the edge detection plate 32 is located in the path of light between illumination source 37 and CCD 43. Since the CCD 43 includes a line of photodetectors extending in a direction A (see FIG. 3) perpendicular the secondary scanning direction B, origin detection portion 32b intersects part of the line of light emitted by source 37 so that some of the photo-detectors receive light, while others do not receive light. (It should be noted that the line of light emitted by source 37 has a thickness, and thus could also be considered as an area of light that extends in a primary direction.) Next, the AF motor 31 is rotated and the carriages 15 and 16 are moved up or down in the focussing direction and the contrast in one line of data received by CCD 43 is checked. At the in-focus position, as shown by the solid line in FIG. 11, the change from black to white is nearly a right angle. The FIG. 11 line becomes less inclined the more the position is shifted away from the in-focus position. The origin in the focussing direction is the carriage position in the focussing direction where the most vertical change from black to white is obtained from one line of data (i.e., the position of the carriage when a line having the shape of the FIG. 11 solid line is produced).

Figure 12:
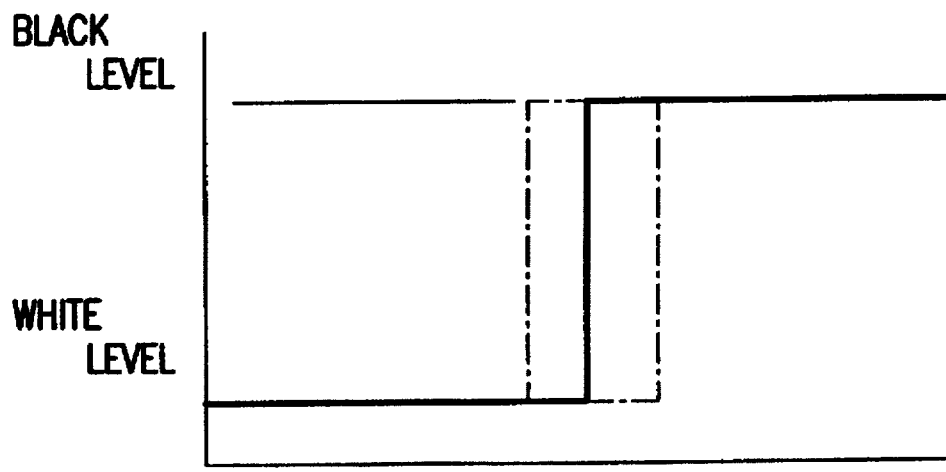
FIG. 12 is a wave diagram showing the secondary scanning position adjustment operation according to the first embodiment of the present invention.

Next, when the focussing of the edge detection plate 32 matches, origin detection can be performed in the secondary scanning direction. When the inclined surface (i.e., the origin detection portion 32b) of the edge detection plate 32, which is inclined at a 45° angle ($\Theta 1$) from the secondary scanning direction, is read by the CCD 43, the address of the photodetector in the primary scanning direction where black changes to white varies with the movement of the carriages 15 and 16 in the secondary scanning direction, as shown in FIG. 12. An address of a photodetector in the primary scanning direction can be designated in advance as the address where the black-to-white changing point should be located in order for the carriage to be in its origin position relative to the secondary scanning direction. For example, the address of a central photodetector in the CCD 43 can correspond to the designated address. Accordingly, in order to place the carriage in the origin position for the secondary scanning direction, the carriage is moved by motor 11 until the point where black changes to white agrees with the designated address in the primary scanning direction.

As shown in FIG. 6, a groove 16d is formed in the longitudinal direction on the underside of the rack 16c of the rack carriage 16. A rack support bar 33 pressed onto the mechanical body 4 fits into this groove 16 allowing for movement of rack 16c and the associated carriage in the secondary scanning direction. Through this arrangement, the camber of the rack 16c is suppressed, and the fit with the pinion gear 14 is made certain.

Position can be determined through fixing the rack support bar 33 to the mechanical body 4, and through a mechanical body 4 in which the guide bars 17 control the movement of the rack carriage 16 in the secondary scanning direction. Consequently, it is possible to minimize the positional error between the guide bars 17 and the rack carriage groove 16d. Accordingly, it becomes possible for the carriage component to move smoothly in the secondary scanning direction.

In addition, by having the mechanical body made of a material with good joint movement characteristics, such as a plastic molded material, it becomes possible to also have the rack support bar 33 made into a single piece with the mechanical body 4.

Figures 14A, 14B:
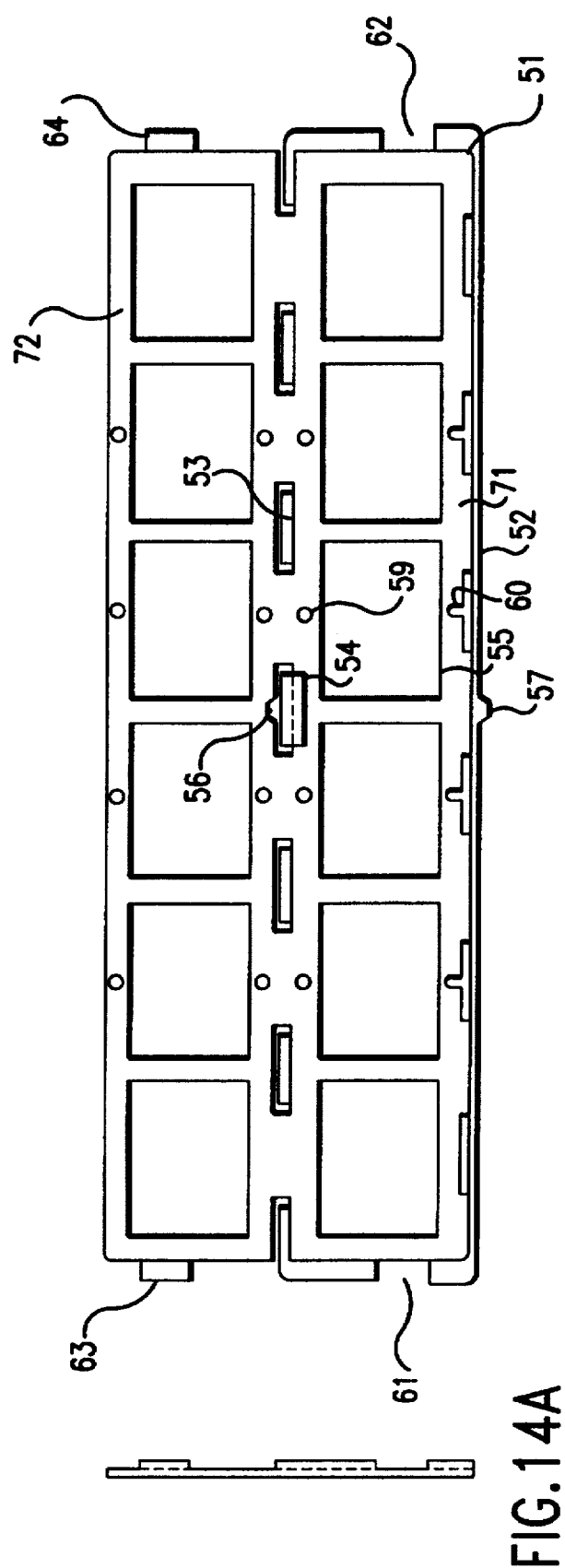
FIGS. 14A-14B are front and side surface diagrams of the FIGS. 13A-13C film holder in an open state.

As shown in FIGS. 14A–14C, the film holder 51 is essentially structured so that the strip film is sandwiched between a receiver 71 and a lid 72. When the film is loaded in the film holder 51, the film is placed in the receiver so that the frames in the strip of film are lined up with six apertures 55. The film is restrained in the direction of the 35 mm width by a protrusion 52 of the film holder, four protrusions 53 and a canopy 54. The canopy 54 fixes the film so that it cannot easily float up when the film is inserted below it.

Engagement 61, engagement 63, engagement 62 and engagement 64 are provided on the left and right on the receiver 71 and the lid 72. After the film has been loaded and the lid 72 is closed, the engagements 61 and 63 fit together, as do the engagements 62 and 64. By doing this, the receiver 71 and the lid 72 are made so they cannot easily pop open, and the film is fixed with no floating upward of the ends of the film holder (the left and right ends in FIGS. 13A–13C and 14A–14C).

After the film has been secured, the film holder is inserted into an adapter 81 and the frame to be read is set into position within adaptor 81. As shown in FIGS. 13A–13C, by inserting the film strip into the adapter 81, movement of the film frame being read is eliminated. The film holder 51 is inserted into a slot 81a (FIG. 13C) of the adapter 81. The frame lined up with the aperture 81b of the adapter 81 is the frame where reading will take place. The thickness of the film holder 51 is established so that it fits into the opening 81a. The width of the film holder is set so that it fits between restraints 86 and 87. The adapter 81 can be easily removed from the scanner because the adapter is made to have a length of two frames, as indicated by the arrow in FIG. 13B.

In addition, maintenance of the film holder 51 in place within adaptor 81 is achieved by providing semispherical projections 89 (FIG. 13C) in two locations in the adapter 81, which fit into position determination holes 59 and 60 provided in the film holder 51. Projections 56 and 57 are provided on the film holder, and restraints 86 and 87 are provided on the adapter 81. These restraints 86 and 87 are positioned in adaptor 81 relative to the length of film holder 51 so that only two frames extend beyond the reading position (i.e., the position of aperture 81b). This makes it such that three or more frames cannot be inserted beyond the reading position. This is done because of limitations on the size of the scanner in the direction of its depth.

Accordingly, as shown in FIG. 13B, film holder 51 is inserted into adaptor 81 with three frames extending beyond the reading position (i.e., to the left). In addition, to read the three frames to the right, the film holder 51 is rotated 180° horizontally, and engagement 62 and engagement 64 are inserted into the slot 81a of the adapter 81.

When the film holder 51 and the adapter 81 are inserted into the insertion opening 7 of the scanner, the sides 81c and 81d of the adapter 81 come into contact with the ejection plate 22 described above, and receive a force in the direction in which the film holder is discharged. It would also be appropriate to first insert the adapter 81 into the scanner and afterwards insert the film holder 51.

Figure 15A:
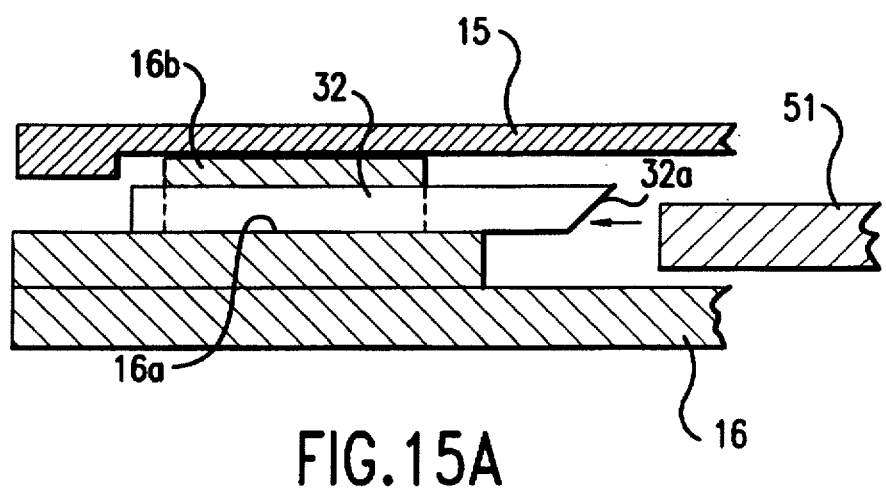
FIGS. 15A-15C are side views illustrating how the present invention can be used to provide an origin detection element that moves out of the path of the document holder when the document holder is inserted into the carriage.

When the film holder 51 and the adapter 81 are inserted into the insertion opening 7 of the scanner, the film holder 51 comes into contact with the inclined surface 32a (see FIG. 16) of the edge detection plate 32, as shown in FIG. 15A. The edge detection plate 32 is sandwiched between carriages 15 and 16, but is capable of moving in the direction of focussing (i.e., up and down in FIGS. 15A–15C), using the projections 16b of the rack carriage 16 described above as guides. Accordingly, as the film holder 51 moves farther to the left in FIG. 15A, the edge detection plate 32 is moved in the upward direction, as shown in FIG. 15B, and the film holder 51 passes under the edge detection plate 32.

Figure 15B:
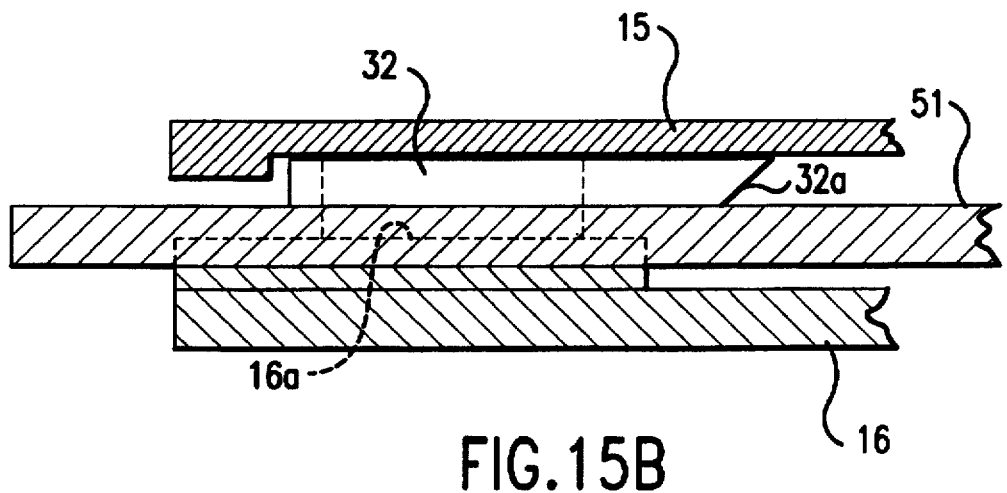
Figure 15C:
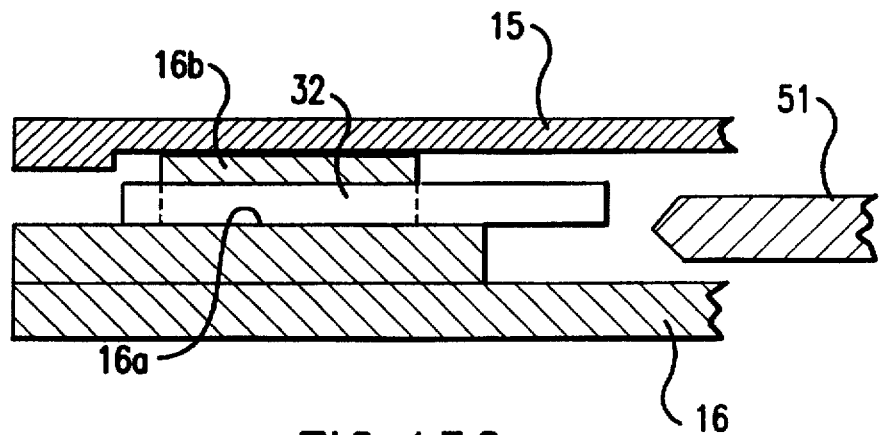

In FIGS. 15A and 15B, the edge detection plate 32 is provided with an inclined surface 32a (see FIG. 16) and is made so that the edge detection plate 32 moves in the upward direction in FIG. 15A–15B. However, as shown in FIG. 15C, it is also possible to provide the film holder 51 with an inclined surface so that the edge detection plate 32 is moved in the upward direction in FIG. 15C.

With the embodiments described above, because the edge detection plate 32 can withdraw upon insertion of the film holder 51, focus origin detection is possible even if a strip film holder is used which is longer than general slide mounts, which only hold a single frame.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image input device comprising:

an illumination source that generates an area of light extending in a primary scanning direction and travelling along an optical axis;

a carriage that is movable in a secondary scanning direction that intersects to said primary scanning direction, said carriage intersecting said optical axis so that said area of light is transmitted to said carriage;

an image reading device that receives light transmitted to the carriage and outputs a signal based on said received light; and an origin detection element movably attached to said carriage, said origin detection element being movable between a first position when no document is located in said carriage and a second position when the document is inserted in said carriage, said first position being located in a document insertion path of the carriage, said second position being outside of said insertion path, said carriage being movable to a position where said origin detection element intersects said optical axis when no document is inserted in said carriage.

2. An image input device as in claim 1, wherein said carriage includes a guide member that slidably engages said origin detection element to guide said origin detection element between said first position and said second position.

3. An image input device as in claim 2, wherein said carriage includes a biasing member that biases said origin detection element to said first position.

4. An image input device as in claim 1, wherein said origin detection element is a plate, said plate including at least one aperture, said carriage including at least one guide member slidably received in said at least one aperture to guide said plate between said first position and said second position.

5. An image input device as in claim 4, wherein said carriage includes a biasing member that biases said plate to said first position.

6. An image input device as in claim 1, wherein said second position is spaced from said first position in a third direction, said third direction intersecting with to a plane containing both said primary scanning direction and said secondary scanning direction.

7. An image input device as in claim 1, further comprising a document holder for holding said document, said document holder being removably insertable into said carriage and engageable with said origin detection element so as to move said origin detection element from said first position to said second position.

8. An image input device as in claim 7, wherein said document holder includes a first engagement surface that engages a second engagement surface located on said origin detection element, at least one of said first engagement surface and said second engagement surface being tapered.

9. An image input device as in claim 1, wherein said illumination source is located on a first side of said carriage and said image reading device is located on a second side of said carriage opposite from said first side so that said image input device is capable of reading transparent documents.

10. An image input device as in claim 9, further comprising a document holder for holding said transparent document, said document holder being removably insertable into said carriage and engageable with said origin detection element so as to move said origin detection element from said first position to said second position, said transparent document being a transparent strip of film containing multiple frames of images.

11. An image input device as in claim 1, wherein said origin detection element includes an edge surface that is disposed in said carriage relative to said area of light so as to block a first portion of said area of light, while allowing a second portion of said area of light to continue along said optical axis to said image reading device.

12. An image input device as in claim 11, wherein said edge surface is arranged at an angle greater than 0° relative to said primary scanning direction.

13. An image input device as in claim 12, wherein said edge surface is arranged at an angle of about 45° relative to said primary scanning direction.

14. An image input device as in claim 11, further comprising:
a guide assembly extending in said secondary scanning direction, said carriage being slidably engaged with said guide assembly for reciprocation in said secondary scanning direction; and
a carriage drive mechanism coupled to said carriage to reciprocate said carriage in said secondary scanning direction, wherein said carriage drive mechanism moves said carriage to a designated origin position in the secondary scanning direction based on an output of said image reading device when said edge surface is blocking the first portion of said area of light, while allowing the second portion of said area of light to continue along said optical axis to said image reading device.

15. An image input device as in claim 14, wherein said guide assembly is movable in a third direction parallel to said optical axis, and further comprising:
a focus adjustment drive mechanism coupled to said guide assembly to reciprocate said guide assembly and said carriage in said third direction, wherein said focus adjustment drive mechanism moves said guide assembly and said carriage to an in-focus position based on the output of said image reading device when said edge surface is blocking the first portion of said area of light, while allowing the second portion of said area of light to continue along said optical axis to said image reading device.

16. An image input device as in claim 11, wherein said carriage is movable in a third direction parallel to said optical axis, and further comprising:
a focus adjustment drive mechanism coupled to said carriage to reciprocate said carriage in said third direction, wherein said focus adjustment drive mechanism moves said carriage to an in-focus position based on the output of said image reading device when said edge surface is blocking the first portion of said area of light, while allowing the second portion of said area of light to continue along said optical axis to said image reading device.

17. An image input device as in claim 14, wherein said guide assembly includes a pair of parallel rods extending in said secondary scanning direction, and said carriage drive mechanism includes a motor having a drive shaft coupled to a drive gear, a driven gear coupled to said drive gear, a rack coupled to said driven gear, said rack attached to said carriage.

18. An image input device as in claim 16, further comprising:
a pair of parallel rods extending in said secondary scanning direction, said carriage being slidably engaged with said pair of rods for reciprocation in said secondary scanning direction, said pair of guide rods being movable in said third direction so that said carriage is movable in said third direction; a first motor having a drive shaft coupled to a drive gear, a driven gear coupled to said drive gear, a rack coupled to said driven gear, said rack attached to said carriage and extending in said secondary scanning direction to drive said carriage in said secondary scanning direction, and wherein:
said secondary focus adjustment mechanism includes a movable adjustment member having a cammed surface, and a guiding member attached to said pair of guide rods and engaging said cammed surface so that movement of said movable adjustment member moves said pair of guide rods in said third direction.

19. An image input device as in claim 18, wherein said movable adjustment member is a rotatable disk.

20. An image input device as in claim 19, further comprising a second motor coupled to said rotatable disk.

21. An image input device comprising:

an illumination source that generates an area of light extending in a primary scanning direction and travelling along an optical axis;

a carriage that is movable in a secondary scanning direction that intersects to said primary scanning direction, said carriage intersecting said optical axis so that said area of light is transmitted to said carriage, said carriage being movable in a third direction parallel to said optical axis;

an image reading device that receives light transmitted to the carriage and outputs a signal based on said received light;

an origin detection element attached to said carriage, said carriage being movable to a position where said origin detection element intersects said optical axis; and a focus adjustment drive mechanism coupled to said carriage to reciprocate said carriage in said third direction, wherein said focus adjustment drive mechanism moves said carriage to an in-focus position based on the output of said image reading device when said origin detection element is intersecting said optical axis.

22. An image input device as in claim 21, wherein said origin detection element includes an edge surface that is disposed in said carriage relative to said area of light so as to block a first portion of said area of light, while allowing a second portion of said area of light to continue along said optical axis to said image reading device when said origin detection element is intersecting said optical axis, and wherein said focus adjustment drive mechanism moves said carriage to said in-focus position based on the output of said image reading device when said edge surface is blocking the first portion of said area of light, while allowing the second portion of said area of light to continue along said optical axis to said image reading device.

23. An image input device as in claim 21, further comprising a pair of parallel rods extending in said secondary scanning direction, said carriage being slidably engaged with said pair of rods for reciprocation in said secondary scanning direction, said pair of guide rods being movable in said third direction so that said carriage is movable in said third direction; a first motor having a drive shaft coupled to a drive gear, a driven gear coupled to said drive gear, a rack coupled to said driven gear, said rack attached to said carriage and extending in said secondary scanning direction to drive said carriage in said secondary scanning direction, and wherein:

said secondary focus adjustment mechanism includes a movable adjustment member having a cammed surface, and a guiding member attached to said pair of guide rods and engaging said cammed surface so that movement of said movable adjustment member moves said pair of guide rods in said third direction.

24. An image input device as in claim 22, wherein said edge surface is arranged at an angle greater than 0° relative to said secondary scanning direction.

25. An image input device as in claim 24, wherein said edge surface is arranged at an angle of about 45° relative to said secondary scanning direction.

26. An image input device comprising:

an illumination source that generates an area of light extending in a primary scanning direction and travelling along an optical axis;

a carriage that is movable in a secondary scanning direction that intersects to said primary scanning direction, said carriage intersecting said optical axis so that said area of light is transmitted to said carriage;

an image reading device that receives light transmitted to the carriage and outputs a signal based on said received light;

an origin detection element attached to said carriage, said carriage being movable to a position where said origin detection element intersects said optical axis;

a guide assembly extending in said secondary scanning direction, said carriage being slidably engaged with said guide assembly for reciprocation in said secondary scanning direction; and a carriage drive mechanism coupled to said carriage to reciprocate said carriage in said secondary scanning direction, wherein said carriage drive mechanism moves said carriage to a designated origin position in the secondary scanning direction based on an output of said image reading device when said origin detection element is intersecting said optical axis.

27. An image input device as in claim 26, wherein said origin detection element includes an edge surface that is disposed in said carriage relative to said area of light so as to block a first portion of said area of light, while allowing a second portion of said area of light to continue along said optical axis to said image reading device when said origin detection element is intersecting said optical axis, and wherein said carriage drive mechanism moves said carriage to said designated origin position in the secondary scanning direction based on an output of said image reading device when said edge surface is blocking the first portion of said area of light, while allowing the second portion of said area of light to continue along said optical axis to said image reading device.

28. An image input device as in claim 26, wherein said guide assembly is movable in a third direction parallel to said optical axis, and further comprising:

a focus adjustment drive mechanism coupled to said guide assembly to reciprocate said guide assembly and said carriage in said third direction, wherein said focus adjustment drive mechanism moves said guide assembly and said carriage to an in-focus position based on the output of said image reading device when said origin detection element is intersecting said optical axis.

29. An image input device as in claim 27, wherein said edge surface is arranged at an angle greater than 0° relative to said secondary scanning direction.

30. An image input device as in claim 29, wherein said edge surface is arranged at an angle of about 45° relative to said secondary scanning direction.

31. A method of adjusting the focus state of an image input device having an illumination source that generates an area of light extending in a primary scanning direction and travelling along an optical axis, a carriage that is movable in a secondary scanning direction that intersects to said primary scanning direction, said carriage intersecting said optical axis so that said area of light is transmitted to said carriage, said carriage being movable in a third direction parallel to said optical axis, and an image reading device that receives light transmitted to the carriage and outputs a signal based on said received light, said method comprising the steps of:

positioning said carriage so that an origin detection element attached to said carriage intersects said optical axis; and moving said carriage in said third direction based on the output of said image reading device when said origin detection element is intersecting said optical axis until said carriage is moved to said in-focus position.

32. A method as in claim 31, wherein a focus adjustment drive mechanism coupled to said carriage moves said carriage in said third direction.

33. A method as in claim 31, wherein said step of positioning said carriage includes positioning an edge surface of said origin detection element so as to block a first portion of said area of light, while allowing a second portion of said area of light to continue along said optical axis to said image reading device.

34. A method as in claim 33, wherein said edge surface is arranged at an angle greater than 0° relative to said secondary scanning direction.

35. A method as in claim 34, wherein said edge surface is arranged at an angle of about 45° relative to said secondary scanning direction.

36. A method as in claim 31, further comprising the step of moving said carriage in said secondary scanning direction to a designated origin position in the secondary scanning direction based on the output of said image reading device when said origin detection element is intersecting said optical axis.

37. A method of adjusting a secondary scanning direction position of an image input device having an illumination source that generates an area of light extending in a primary scanning direction and travelling along an optical axis, a carriage that is movable in said secondary scanning direction, said secondary scanning direction intersecting with to said primary scanning direction, said carriage intersecting said optical axis so that said area of light is transmitted to said carriage, and an image reading device that receives light transmitted to the carriage and outputs a signal based on said received light, said method comprising the steps of:

positioning said carriage so that an origin detection element attached to said carriage intersects said optical axis; and moving said carriage in said secondary scanning direction to a designated origin position in the secondary scanning direction based on the output of said image reading device when said origin detection element is intersecting said optical axis.

38. A method as in claim 37, wherein said step of positioning said carriage includes positioning an edge surface of said origin detection element so as to block a first portion of said area of light, while allowing a second portion of said area of light to continue along said optical axis to said image reading device.

39. A method as in claim 38, wherein said edge surface is arranged at an angle greater than 0° relative to said secondary scanning direction.

40. A method as in claim 39, wherein said edge surface is arranged at an angle of about 45° relative to said secondary scanning direction.

* * * * *